(12) United States Patent  (10) Patent No.: US 9,045,895 B1
Lin  (45) Date of Patent: Jun. 2, 2015

(54) KNEE BRACE

(71) Applicant: Jin-Jie Lin, Livermore, CA (US)

(72) Inventor: Jin-Jie Lin, Livermore, CA (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 0 days.

(21) Appl. No.: 14/225,265

(22) Filed: Mar. 25, 2014

(51) Int. Cl.
| E04B 1/38 | (2006.01) |
| E04B 1/26 | (2006.01) |
| E04B 1/41 | (2006.01) |
| E04B 2/70 | (2006.01) |
| F16B 15/00 | (2006.01) |
| E04B 7/04 | (2006.01) |
| E04B 1/24 | (2006.01) |

(52) U.S. Cl.
CPC .............. E04B 1/2608 (2013.01); E04B 1/40 (2013.01); E04B 2/70 (2013.01); *E04B 2001/405* (2013.01); F16B 15/0053 (2013.01); E04B 7/045 (2013.01); *E04B 2001/2415* (2013.01)

(58) Field of Classification Search
CPC .......... E04B 1/2608; E04B 2001/2415; E04B 2001/2684; E04B 7/045; E04C 2003/026; F16B 15/0053
See application file for complete search history.

(56) References Cited

U.S. PATENT DOCUMENTS

| 230,438 | A | 7/1880 | Porter |
| 493,882 | A | 3/1893 | White |
| 1,161,432 | A | 11/1915 | Wolf |
| 1,471,159 | A | 10/1923 | Howie et al. |
| 1,607,166 | A | 11/1926 | McCall |
| 1,945,925 | A * | 2/1934 | Stiefel ............................... 403/2 |
| 2,037,736 | A | 4/1936 | Payne et al. |
| 2,141,107 | A | 12/1938 | Gruelich |
| 2,203,987 | A | 6/1940 | Galante |
| 2,268,681 | A | 1/1942 | Vernon |
| 2,473,217 | A | 6/1949 | Peoples |
| 2,590,159 | A | 3/1952 | Davis |
| 2,638,643 | A | 5/1953 | Olson |
| 2,661,822 | A | 12/1953 | Wisok |
| 2,867,302 | A | 1/1959 | Miller |
| 3,062,570 | A | 11/1962 | Schwartz |
| 3,102,616 | A | 9/1963 | Simpkins |
| 3,184,800 | A | 5/1965 | Nelson |
| 3,305,252 | A | 2/1967 | Jureit |
| 3,365,222 | A | 1/1968 | Polyak |
| 3,423,898 | A | 1/1969 | Tracy |
| 3,912,407 | A | 10/1975 | Heininger |
| 3,914,062 | A | 10/1975 | Heininger |

(Continued)

FOREIGN PATENT DOCUMENTS

WO    WO 2005/052390 A1    6/2005

OTHER PUBLICATIONS

"SBV Shelf Bracket, CF Concrete Form Angle and CF Concrete Form Angle". Simpson Strong-Tie Company Catalog, 1985, pp. 4 and 32. Simpson Strong-Tie Company, Inc., USA.

(Continued)

*Primary Examiner* — Adriana Figueroa
(74) *Attorney, Agent, or Firm* — James Cypher; Charles Cypher

(57) ABSTRACT

A connector having a first substantially planar member connected to a second substantially planar member by means of a fold line between the first and second members that allows the first member and the second member to be bent across the fold line such that the first member and the second member are disposed at one of a variety of selected angles to one another.

18 Claims, 7 Drawing Sheets

(56) References Cited

U.S. PATENT DOCUMENTS

| | | | |
|---|---|---|---|
| 4,022,537 | A | 5/1977 | Gilb et al. |
| 4,036,149 | A | 7/1977 | White |
| 4,039,137 | A | 8/1977 | Smith |
| 4,120,600 | A | 10/1978 | Rees |
| 4,202,649 | A | 5/1980 | Cook et al. |
| 4,344,366 | A | 8/1982 | Madland |
| 4,429,489 | A | 2/1984 | Fischer |
| 4,480,941 | A | 11/1984 | Gilb et al. |
| 4,513,554 | A | 4/1985 | Johnson et al. |
| 4,514,950 | A | 5/1985 | Goodson, Jr. |
| 4,572,695 | A | 2/1986 | Gilb |
| 4,592,672 | A | 6/1986 | Ruch, Jr. |
| 4,637,195 | A | 1/1987 | Davis |
| 4,683,698 | A | 8/1987 | Churchman |
| 4,688,358 | A | 8/1987 | Madray |
| 4,699,547 | A | 10/1987 | Seegmiller |
| 4,805,315 | A | 2/1989 | Nesbitt |
| 4,812,075 | A | 3/1989 | Lavin, Sr. |
| 4,957,186 | A | 9/1990 | Reetz |
| 5,071,280 | A | 12/1991 | Turner |
| 5,104,252 | A | 4/1992 | Colonias et al. |
| 5,110,234 | A | 5/1992 | Makinen |
| 5,111,632 | A | 5/1992 | Turner |
| 5,217,317 | A | 6/1993 | Young |
| 5,312,078 | A | 5/1994 | Marsh |
| 5,335,469 | A * | 8/1994 | Stuart ........................ 52/655.1 |
| 5,380,115 | A * | 1/1995 | Colonias ........................ 403/170 |
| 5,380,116 | A * | 1/1995 | Colonias ........................ 403/232.1 |
| D364,331 | S | 11/1995 | Leek |
| D374,165 | S | 10/1996 | Marshall |
| 5,603,580 | A | 2/1997 | Leek |
| 5,639,150 | A | 6/1997 | Anderson et al. |
| 5,797,694 | A | 8/1998 | Breivik |
| 5,806,265 | A | 9/1998 | Sluiter |
| 5,806,945 | A | 9/1998 | Anderson et al. |
| D406,813 | S | 3/1999 | Coll et al. |
| D414,398 | S | 9/1999 | Benz et al. |
| 6,047,513 | A | 4/2000 | Gibson |
| D428,804 | S | 8/2000 | Benz et al. |
| D430,006 | S | 8/2000 | Finger, Jr. |
| 6,170,218 | B1 | 1/2001 | Shahnazarian |
| 6,230,467 | B1 * | 5/2001 | Leek ........................ 52/702 |
| D443,504 | S | 6/2001 | Benz et al. |
| 6,260,402 | B1 | 7/2001 | Leek |
| 6,397,552 | B1 | 6/2002 | Bourque |
| 6,408,482 | B1 | 6/2002 | Henriott et al. |
| 6,772,570 | B2 | 8/2004 | Horne |
| 7,293,390 | B2 * | 11/2007 | Roesset et al. ........................ 52/92.1 |
| 7,631,463 | B2 | 12/2009 | Greenlee et al. |
| 7,788,873 | B2 * | 9/2010 | Leek ........................ 52/702 |
| 8,443,569 | B2 * | 5/2013 | Sias ........................ 52/715 |
| 8,528,268 | B1 | 9/2013 | Reaves |
| 2002/0112439 | A1 | 8/2002 | Rosas |
| 2002/0124483 | A1 | 9/2002 | Rosas |
| 2003/0154685 | A1 | 8/2003 | Williams |
| 2008/0134620 | A1 * | 6/2008 | Contasti ........................ 52/712 |

OTHER PUBLICATIONS

"Bracket JIS-G3317", Tanaka Steel Catalog, vol. 38, Section 8, four pages including cover, index, back and p. 28, Jul. 1996, Japan.

"Bracket JIS-G3317", Tanaka House Materials Catalog, Section 28, three pages including cover, back and p. 41, Feb. 2003, Japan.

"Wood Construction Connectors: RTC Rigid Tie Connectors". Simpson Strong-Tie Company Catalog C-2001, total of 3 pages including cover, back and p. 135. Simpson Strong-Tie Company, Inc., USA.

"Wood Construction Connectors: LSC Adjustable Stringer Connector". Simpson Strong-Tie Company Catalog C-2011, total of 3 pages including cover, back and p. 184. Simpson Strong-Tie Company, Inc., USA.

* cited by examiner

KNEE BRACE

BACKGROUND OF THE INVENTION

The present invention provides a light-frame structural connection; in particular, the present invention provides a connector for connecting two light framing members at an acute angle, the connector itself occupying the complementary outside obtuse angle.

There are many connectors in light frame construction for connecting two members orthogonally. The present invention provides a connector that can be used to connect two members to each other and in particular two members that are at an acute angle to each other such as in the creation of brace. The connector is particularly adapted for making a strong connection between members at a variety of acute angles.

The present connector is an improved knee-brace stabilizer that makes a structural connection between a first elongated structural member in the form of knee bracing and a second elongated structural member in the form of columns or beams to help stabilize free-standing structures and to comply with many prescriptive deck bracing requirements such as the American Wood Council's "Design for Code Acceptance 6—Prescriptive Residential Wood Deck Construction Guide". The connector is particularly adapted for bracing 2×, 4× and 6× in line post-to-beam configurations.

SUMMARY OF THE INVENTION

The present invention provides a connector that has a first substantially planar member connected to a second substantially planar member by means of a fold region or line between the first and second substantially planar members. The fold region allows the first substantially planar member and the second substantially planar member to be bent relative to each other at the fold between them so that the first substantially planar member and the second substantially planar member are disposed at one of an unlimited variety of selected angles to one another. The first substantially planar member has a first longitudinal axis with the fold being at one end of the axis while a distal end of the first substantially planar member is at the opposite end of the axis. The second substantially planar member has a second longitudinal axis with the fold being at one end of the axis while a distal end of the second substantially planar member is at the opposite end of the axis. The distal ends of the two substantially planar members generally face away from each other. Also in the present invention, a first panel member is connected to the first planar member at a first angular juncture or bend line, and a second panel member is connected to the second planar member at a second angular juncture or bend line.

The first bend line is disposed orthogonally to the fold line, and the second bend line is also disposed orthogonally to the fold line, and when the first and second planar members are disposed at an angle of 180 degrees to each other, such that they lie in a single plane, the first and second bend lines are aligned. The first bend line is laterally disposed away from the longitudinal axis of the first substantially planar member and the second bend line is laterally disposed away from the longitudinal axis of the second substantially planar member. The first panel member is disposed at an angle to the first substantially planar member such that they do not lie in the same plane and the second panel is disposed at an angle to the second substantially planar member such that they do not lie in the same plane. The first and second panel members occupy substantially the same plane. Also in the present invention, the first panel member is formed with a proximal end and a distal end with the proximal end disposed near the fold between the first and second members and the distal end disposed away from the fold. Similarly, the second panel member is formed with a proximal end and a distal end with the proximal end disposed near the fold between the first and second members and the distal end disposed away from the fold. The proximal end of the first panel is formed with a first extension that extends away from the first panel member and extends beyond the fold between the first and second members. Similarly, the proximal end of the second panel is formed with a second extension that extends beyond the fold between the first and second members.

It is an object of the present invention to provide a connector that can be manufactured inexpensively. This object is achieved in part by forming the connector from a generally rectangular metal blank, such that the lateral edges of the first and second panel members are aligned when the first and second members are aligned in the same plane. This object is further achieved by forming the first extension of the first panel member by notching the material of the second panel member, and similarly forming the second extension of the second panel member by notching the material of the first panel member.

It is an object of the present invention to provide a connector that is readily configured to connections of various angles.

The present invention also provides a connection between a first elongated framing member and a second elongated framing member, the first connection having a connector that attaches to the first and second framing members by means of fasteners inserted through the connector into the first and second framing members. The first elongated framing member is formed with a first planar attachment face and a lateral attachment face disposed at an angle to the first planar attachment face. The second elongated framing member is formed with a second planar attachment face and a lateral attachment face disposed at an angle to the second planar attachment face. One or both of the first and second elongated framing members is also formed with a planar abutment face when the first and second framing members are connected at an angle of less than ninety degrees.

The abutment face of either the first or second elongated framing members is in an interfacing or abutting relation with either the first planar attachment face of the first elongated framing member, if the abutment face is formed on the second elongated framing member, or it is in an interfacing or abutting relation with the second planar attachment face of the second elongated framing member if the abutment face is formed on the first elongated framing member.

In some circumstances, the connector is attached to coplanar faces of the first and second structural members that are adjacent to each other. In such an arrangement, the connector is unbent, with both the first and second substantially planar members occupying the same plane.

When forming the connection according to the present invention, the first attachment surface of the first structural member interfaces with the attachment surface of the first planar member of the connector, and the second attachment surface of the second structural member interfaces with the attachment surface of the second planar member of the connector, and the fold line between the first and second planar members is disposed at the interface between the first and second elongated members.

At least one of the first and second substantially planar members with an extension for most acute-angle connections will have fasteners in both structural members. When the connection is between adjacent coplanar surfaces, both planar members will have fasteners in both structural members.

The side panel members of the connector have edges that closely face each other in the connector blank and when the connector is unbent. The narrow space between them forms a S-curve that cuts back along the juncture between one side panel member and one of the planar members so that neither side panel member is attached to a planar member immediately adjacent the fold region that separates the two planar members.

DETAILED DESCRIPTION OF THE INVENTION

Figure 1:
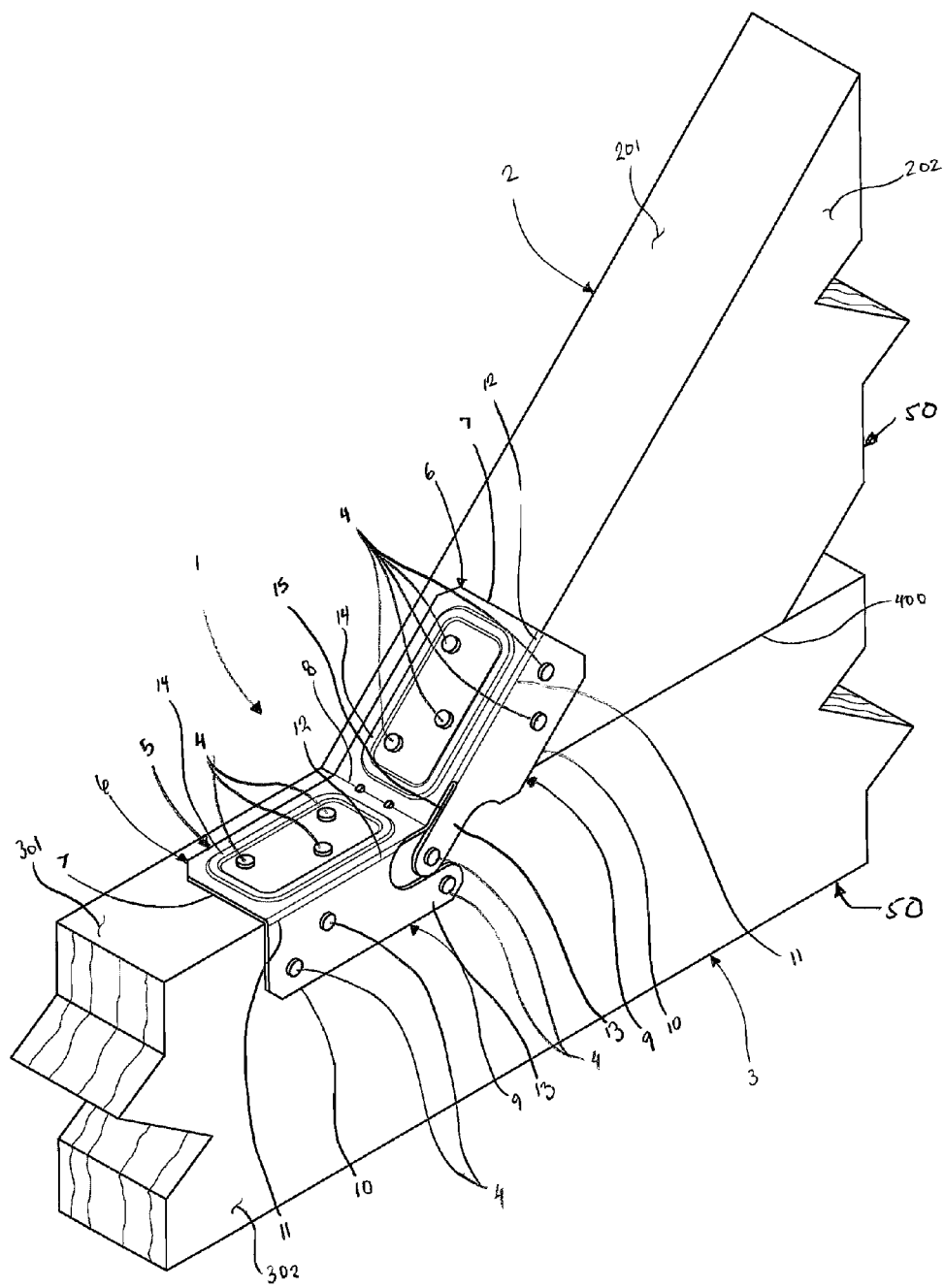
FIG. 1 is a perspective view of a connection formed according to the present invention.
Figure 2:
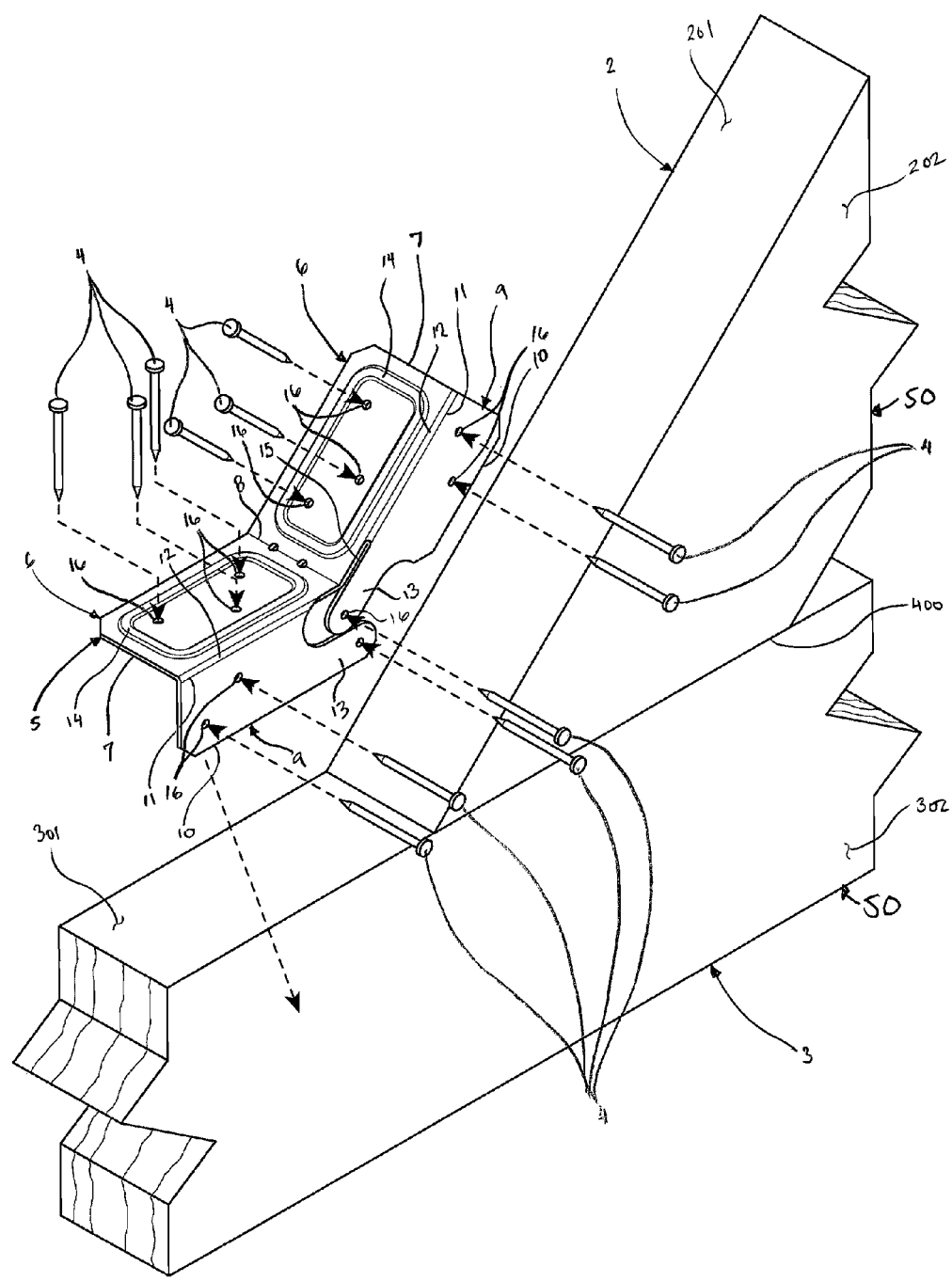
FIG. 2 is an exploded perspective view of a connection formed according to the present invention.
Figure 3:
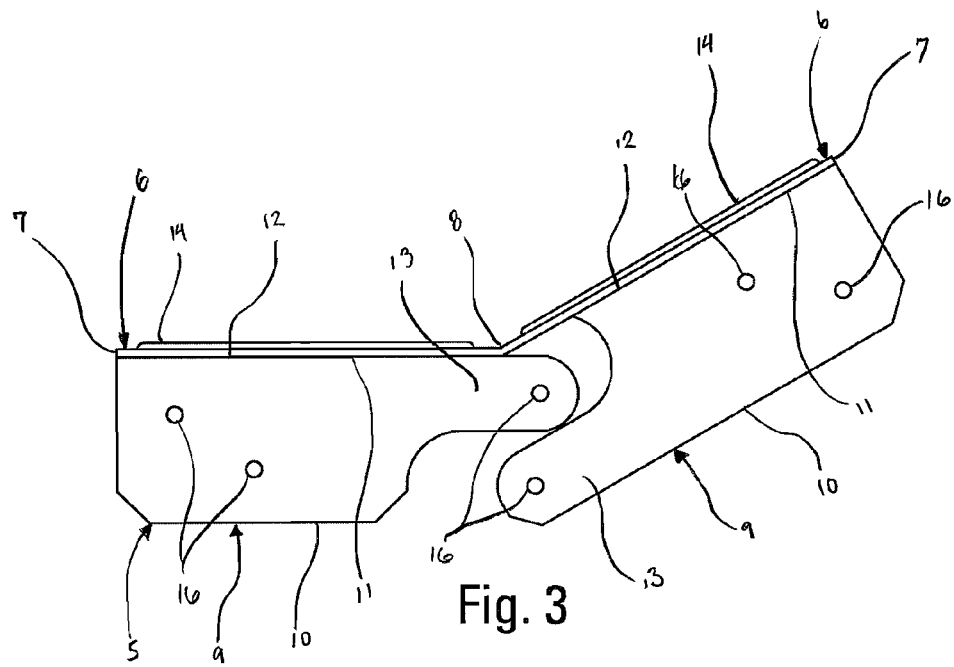
FIG. 3 is a side elevation view of a connector formed according to the present invention.
Figure 4:
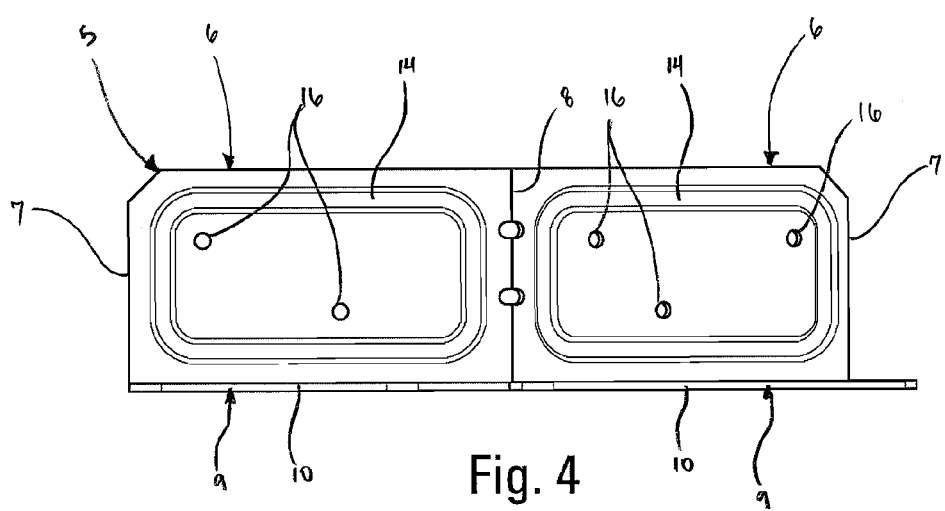
FIG. 4 is a bottom plan view of a connector formed according to the present invention.

As shown in FIG. 1, the present invention is a structural connection 1 comprising a first elongated structural member 50, a second elongated structural member 50, a plurality of fasteners 4, and a connector 5. Preferably, the connector 5 is a knee-brace stabilizer 5 that makes a structural connection 1 between a first elongated structural member 50 in the form of knee bracing 50 and a second elongated structural member 50 in the form of columns 50 or beams 50 to help stabilize free-standing structures and to comply with many prescriptive deck bracing requirements such as the American Wood Council's "Design for Code Acceptance 6—Prescriptive Residential Wood Deck Construction Guide". The connector 5 preferably braces 2×, 4× and 6× in line post-to-beam configurations.

As is also shown in FIG. 1, The first elongated structural member 50 preferably has a first attachment surface 201 and a second attachment surface 202 angularly related to the first attachment surface 201. Preferably, the second elongated structural member 50 has a third attachment surface 301 and a fourth attachment surface 302 angularly related to the third attachment surface 301.

The plurality of fasteners 4 preferably are eight-penny (8d) nails; Simpson Strong-Tie Strong—Drive® SD9×1½ (0.131"×1½") screws can be substituted for eight-penny nails. Preferably, the connector 5 is attached with a total of 12 eight-penny nails. Preferably, the first and second substantially planar members 6 and the first and second panel members 9 are formed with fastener openings 16 that provide the optimal fastener arrangement.

The connector 5 stabilizes the connection 1 between the first elongated structural member 50 and the second elongated structural member 50 in cooperation with the plurality of fasteners 4.

The connector 5 preferably has first and second substantially planar members 6, a first panel member 9, and a second panel member 9. Preferably, the first and second substantially planar members 6 are formed from a rigid material, preferably galvanized sheet steel. The first substantially planar member 6 preferably includes a first end 7, the second substantially planar member 6 includes a second end 7, and there is a fold region 8 disposed between the first end 7 and the second end 7 whereby the first end 7 and the second end 7 are adapted to be disposed at a selectable angle to one another. Preferably, the first substantially planar member 6 is attached to the first attachment surface 201 of the first elongated structural member 50 by at least one fastener 4 between the first end 7 and the fold region 8, and the second substantially planar member 6 is attached to the third attachment surface 301 of the second elongated structural member 50 by at least one fastener 4 between the second end 7 and the fold region 8. The connector 5 is preferably factory-formed with the fold region 8 bent at a 45-degree angle. The fold region 8 can be field bent to other angles, with the caveat that it should be field bent only once.

Preferably, the first panel member 9 is disposed near the first end 7 of the first substantially planar member 6. The first panel member 9 preferably has a first distal end 10 and a first inboard end 11, the first inboard end 11 adjoining the first substantially planar member 6 at a first angular juncture 12. Preferably, the second panel member 9 is disposed near the second end 7, the second panel member 9 having a second distal end 10 and a second inboard end 11, the second inboard end 11 adjoining the second substantially planar member 6 at a second angular juncture 12.

The first panel member 9 and the second panel member 9 are preferably divided from from one another near the fold region 8. Preferably, the first panel member 9 has a first tab extension 13 near the first substantially planar member 6 and the first inboard end 11 and projecting toward the second panel member 9 when the fold region 8 is not folded. The first tab extension 13 is preferably attached to one of the second attachment surface 202 and the fourth attachment surface 302 by at least one fastener 4. Preferably, the second panel member 9 has a second tab extension 13 near the second distal end 10 and projecting toward the first panel member 9 when the fold region 8 is not folded, the second tab extension 13 also being attached to one of the second attachment surface 202 and the fourth attachment surface 302 by at least one fastener 4.

The first tab extension 13 preferably lies between the second tab extension 13 and the substantially planar member 6 when the fold region 8 is not folded. The spacial relationships of the constituent parts of the connector 5 of course change as the angle of fold region 8 is changed.

Figure 5:
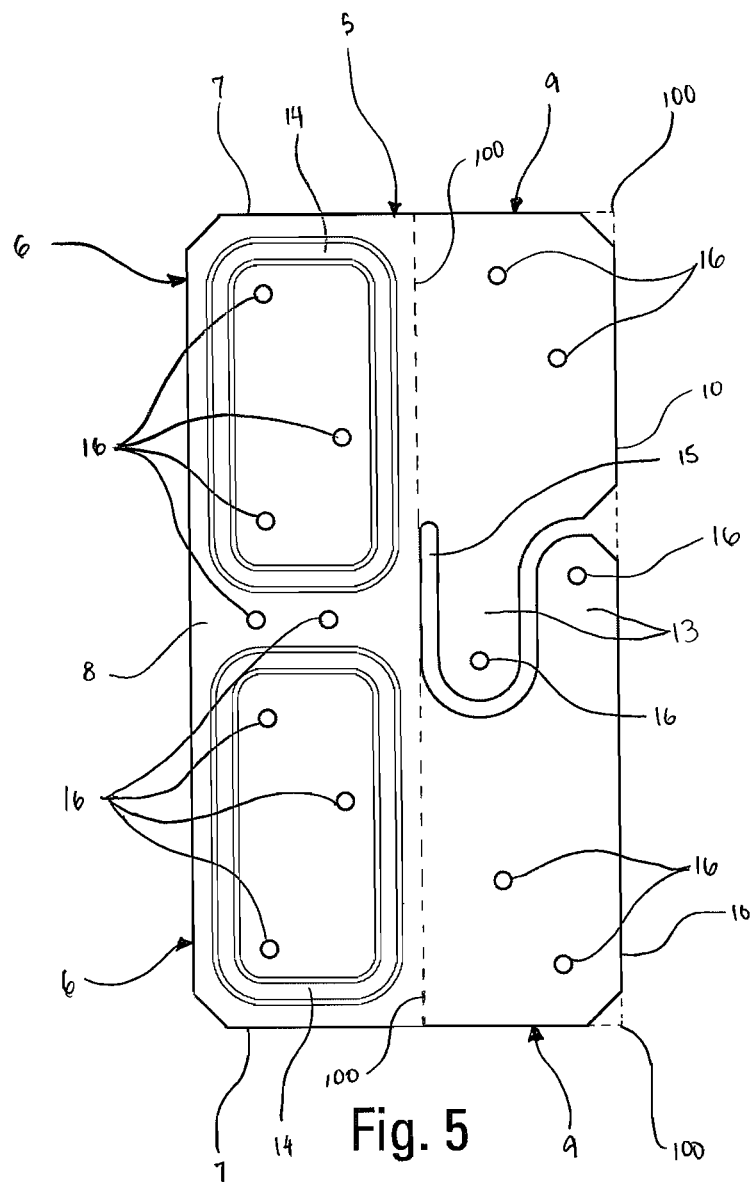
FIG. 5 is a top plan view of the sheet metal blank of a connector formed according to the present invention.
Figure 6:
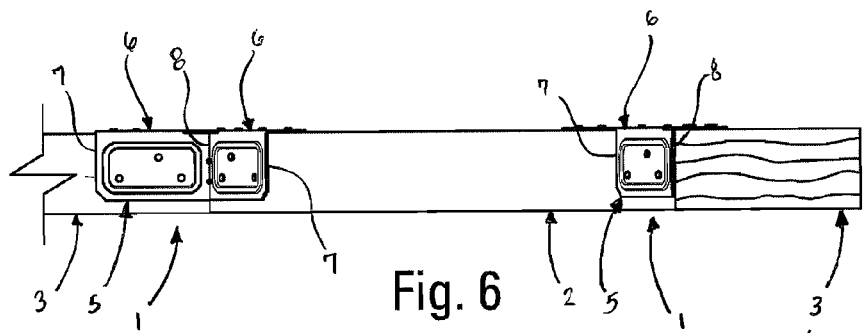
FIG. 6 is a bottom plan view of a plurality of connections formed according to the present invention.
Figure 7:
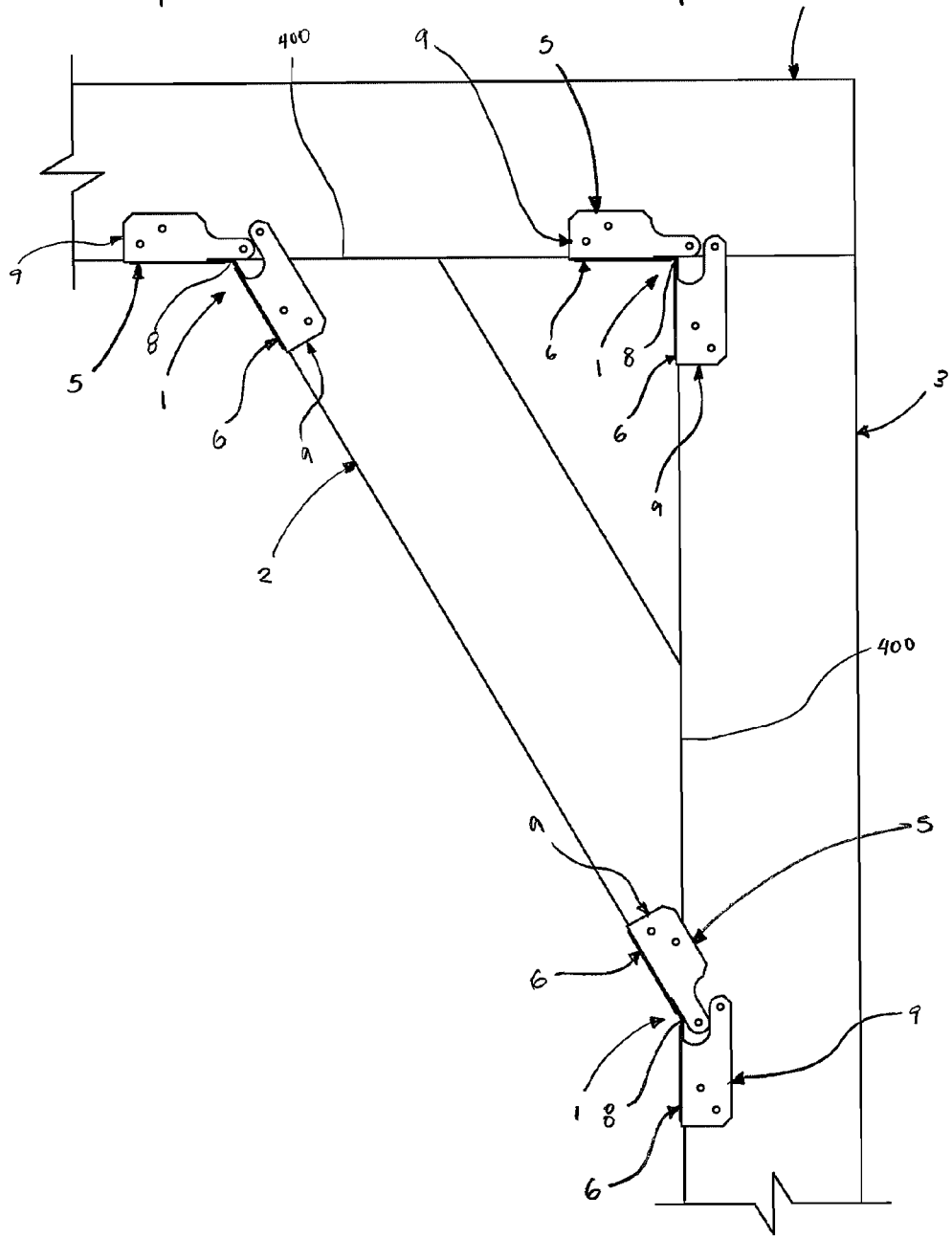
FIG. 7 is a side elevation view of a plurality of connections formed according to the present invention.
Figures 8, 9:
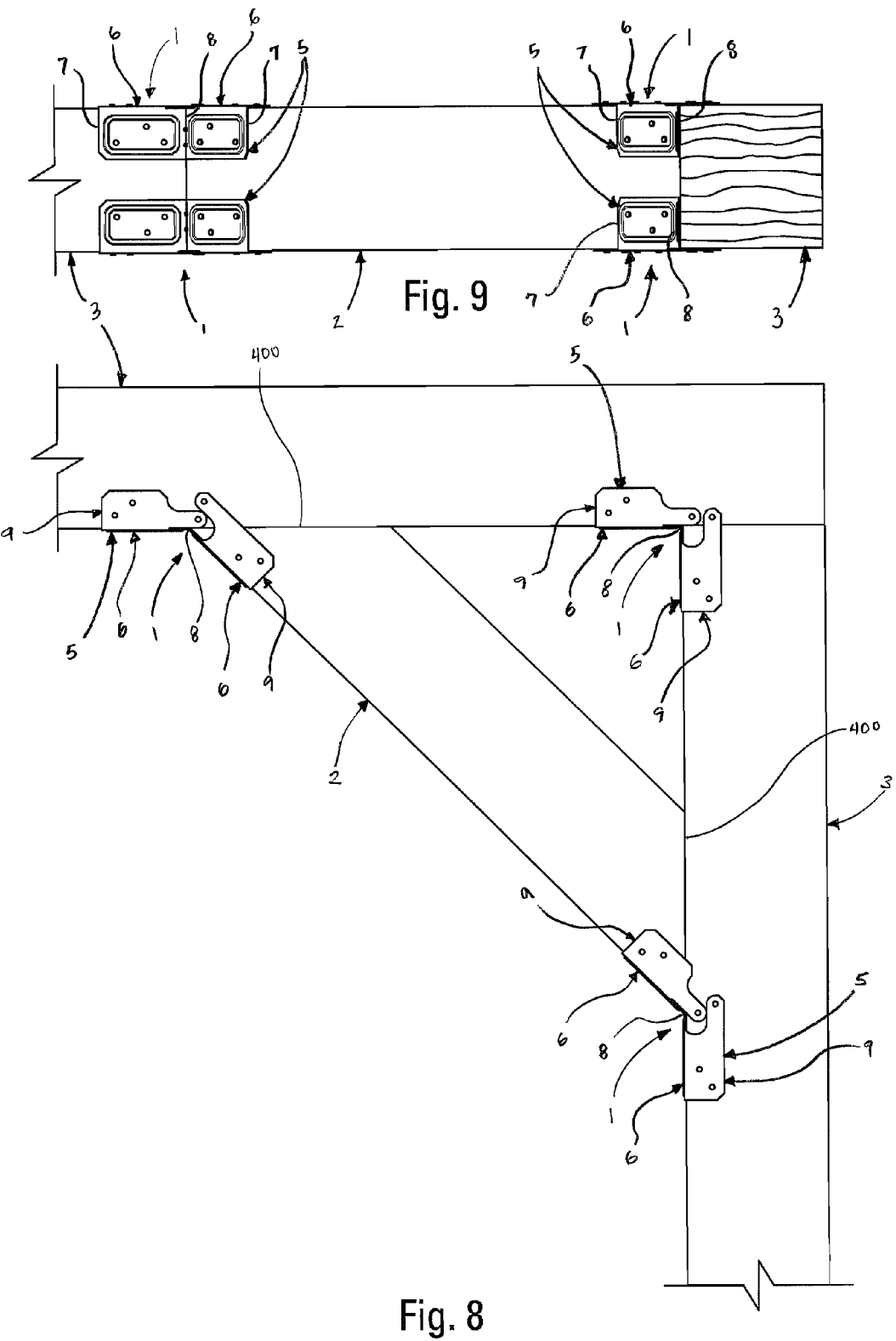
FIG. 8 is a side elevation view of a plurality of connections formed according to the present invention.
FIG. 9 is a bottom plan view of a plurality of connections formed according to the present invention.
Figure 10:
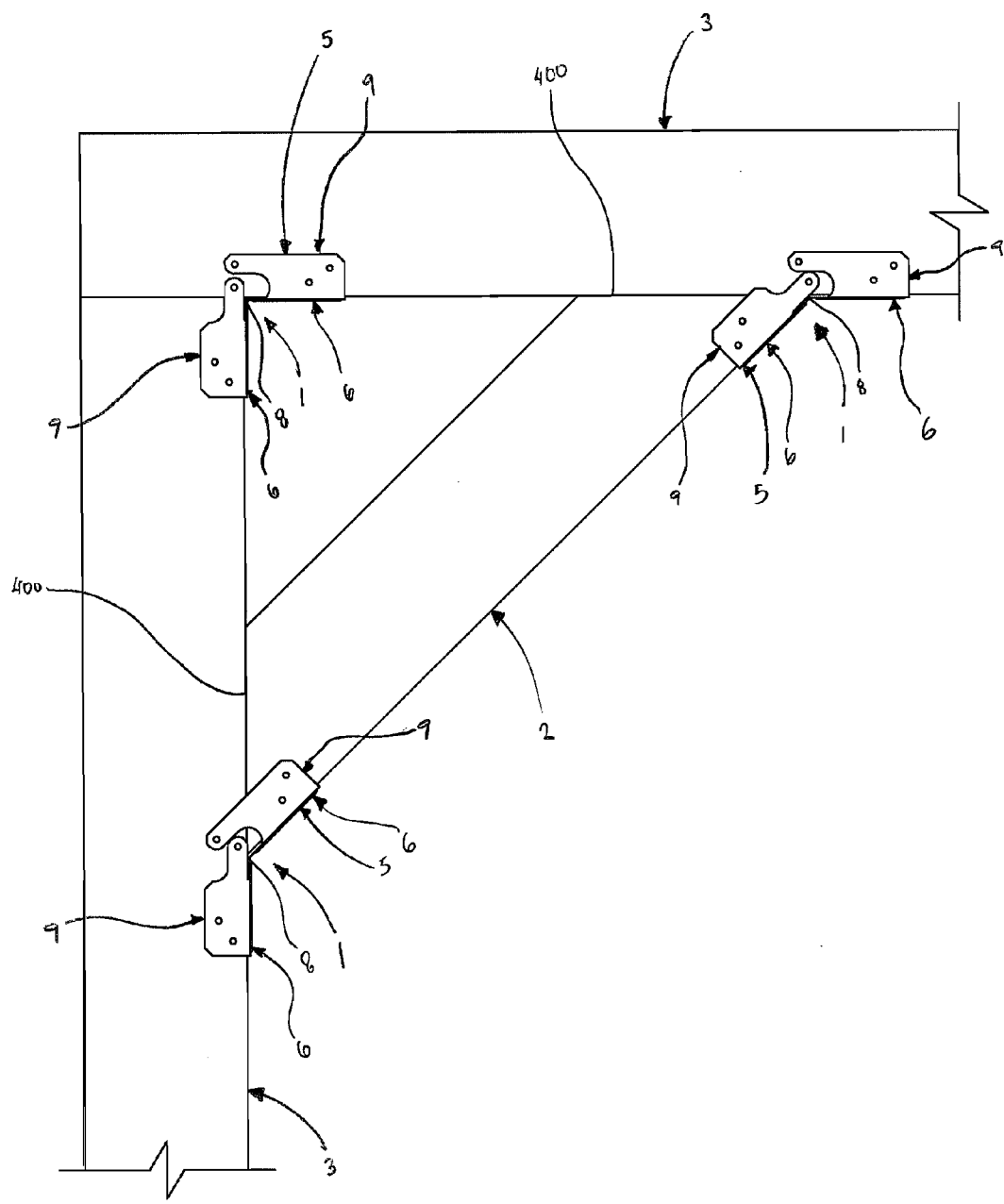
FIG. 10 is a side elevation view of a plurality of connections formed according to the present invention.

As shown in FIG. 5, preferably the first panel member 9 and the second panel member 9 are bounded by a rectangle 100 when the fold region 8 is not folded. As seen in FIG. 5, the flat blank 17 of the entire connector 5 is substantially rectangular, so that material waste is minimized in manufacturing. The connector 5 is preferably formed on automated sheet metal forming machinery.

The width of the first panel member 9 between the first distal end 10 and the first inboard end 11 is preferably the same as the width of the second panel member 9 between the second distal end 10 and the second inboard end 11. Preferably, the first tab extension 13 and the second tab extension 13 are together substantially as wide as the first panel member 9 between the first distal end 10 and the first inboard end 11. The first tab extension 13 and the second tab extension 13 preferably are together substantially as wide as the second panel member 9 between the second distal end 10 and the second inboard end 11.

Preferably, at least one of the first tab extension 13 and the second tab extension 13 extends past the fold region 8. The fold region 8 laterally divides the first and second substantially planar members 6 and one or both of the first and second tab extensions 13 can reach past that division alongside the first and second substantially planar members 6.

The first panel member 9 and the second panel member 9 are preferably separated by a narrow s-curved gap 15 when the fold region 8 is not folded. When the connector 5 is folded, the first and second panel members 9 draw away from each other but the first and second tab extensions 13 remain in close proximity as one rotates around the end of the other.

Preferably, the first panel member 9 is substantially planar and the second panel member 9 is also substantially planar. The first panel member 9 is preferably orthogonal to the portion of the first substantially planar member 6 between the first end 7 and the fold region 8. Preferably, the second panel member 9 is also orthogonal to the portion of the second substantially planar member 6 between the second end 7 and the fold region 8. The fold region 8 preferably can be folded to any angle between 180 degrees and 90 degrees.

Preferably, the substantially planar member 6 of the connector 5 is embossed. The substantially planar member 6 of the connector 5 preferably has a first embossment 14 between the first end 7 and the fold region 8, at least one fastener 4 is located within the first embossment 14. The substantially planar member 6 of the connector 5 preferably has a second embossment 14 between the second end 7 and the fold region 8, at least one fastener 4 is located within the second embossment 14. The embossments 14 are preferably formed as annular rectangles with rounded corners with an un-embossed portion inside each annular rectangle where the fasteners 4 are located. The embossments 14 preferably are discrete elements that do not cross the fold region 8.

Preferably, one of the first elongated structural member 50 and the second elongated structural member 50 is a vertical post. One of the first elongated structural member 50 and the second elongated structural member 50 preferably is a vertical post and the other of the first elongated structural member 50 and the second elongated structural member 50 is a diagonal bracing member. Alternatively, one of the first elongated structural member 50 and the second elongated structural member 50 is a vertical post and the other of the first elongated structural member 50 and the second elongated structural member 50 is a horizontal beam.

Preferably, at least one of the first panel member 9 and the second panel member 9 is additionally attached to one of the first elongated structural member 50 and the second elongated structural member 50 with a fastener 4 that is not in its corresponding tab extension 13.

At least one of the first panel member 9 and the second panel member 9 is preferably attached to one of the first elongated structural member 50 and the second elongated structural member 50 with the fastener 4 that is in its corresponding tab extension 13, and the same panel member 9 is attached to the other of the first elongated structural member 50 and the second elongated structural member 50 with the fastener 4 that is not in its corresponding tab extension 13.

Preferably, both the first and second tab extensions 13 extend past the fold region 8. The first panel member 9 and the second panel member 9 are preferably separated by a narrow gap 15 when the fold region 8 is not folded. Preferably, the first angular juncture 12 does not extend to the fold region 8 such that the narrow gap 15 also separates the first panel member 9 from the first substantially planar member 6 between the fold region 8 and the first end 7 of the substantially planar member 6 adjacent the fold region 8. This effectively separates the first tab extension 13 from the first substantially planar member 6, and not joining the first panel member 9 to the substantially planar member 6 adjacent the fold region 8 substantially increases the strength of the connector 5 because the connector 5 would otherwise be prone to failure by tearing along the first angular juncture 12 adjacent the fold region 8.

As shown in FIG. 1, in most connections 1 typically made with the connector 5, one of the first elongated structural member 50 and the second elongated structural member 50 has an end surface 400 that abuts one of the attachment surfaces 201 or 301 of the other of the first elongated structural member 50 and the second elongated structural member 50. As shown in FIGS. 6, 7, 8, 9 and 10, the typically connection made with the connector 5 of the present invention is a knee brace where an elongated structural member 2 is disposed at an acute angle to two orthogonally disposed elongated structural members 3, further strengthening the connection between the orthogonally disposed, elongated structural members 3.

I claim:

1. A structural connection (1) comprising:
   a. a first elongated structural member (50) having a first attachment surface (201) and a second attachment surface (202) angularly related to the first attachment surface (201);
   b. a second elongated structural member (50) having a third attachment surface (301) and a fourth attachment surface (302) angularly related to the third attachment surface (301);
   d. a plurality of fasteners (4); and
   c. a connector (5) for stabilizing the connection (1) between the first elongated structural member (50) and the second elongated structural member (50) in cooperation with the plurality of fasteners (4), the connector (5) having:
      i. first and second substantially planar members (6) formed from a rigid material, the first substantially planar member (6) including a first end (7), the second substantially planar member (6) including a second end (7), and a fold region (8) disposed between the first end (7) and the second end (7) whereby the first end (7) and the second end (7) are adapted to be disposed at a selectable angle to one another, the first substantially planar member (6) being attached to the first attachment surface (201) of the first elongated structural member (50) by at least one of the fasteners (4) between the first end (7) and the fold region (8), and the second substantially planar member (6) being attached to the third attachment surface (301) of the second elongated structural member (50) by at least one of the fasteners (4) between the second end (7) and the fold region (8);
      ii. a first panel member (9) proximate the first end (7), the first panel member (9) having a first distal end (10) and a first inboard end (11), the first inboard end (11) adjoining the first substantially planar member (6) at a first angular juncture (12); and
      iii. a second panel member (9) proximate the second end (7), the second panel member (9) having a second distal end (10) and a second inboard end (11), the second inboard end (11) adjoining the second substantially planar member (6) at a second angular juncture (12), wherein:

(a) the first panel member (9) and the second panel member (9) are divided from one another proximate the fold region (8);
(b) the first panel member (9) has a first tab extension (13) proximate the substantially planar member (6) and the first inboard end (11) and projecting toward the second panel member (9) when the fold region (8) is not folded, the first tab extension (13) being attached to one of the second attachment surface (202) and the fourth attachment surface (302) by at least one of the fasteners (4);
(c) the second panel member (9) has a second tab extension (13) proximate the second distal end (10) and projecting toward the first panel member (9) when the fold region (8) is not folded, the second tab extension (13) being attached to one of the second attachment surface (202) and the fourth attachment surface (302) by at least one of the fasteners (4).

2. The structural connection (1) of claim 1 wherein:
a. the first tab extension (13) lies between the second tab extension (13) and the substantially planar member (6) when the fold region (8) is not folded.

3. The structural connection (1) of claim 2 wherein:
a. the first panel member (9) and the second panel member (9) are bounded by a rectangle (100) when the fold region (8) is not folded.

4. The structural connection (1) of claim 3 wherein:
a. the width of the first panel member (9) between the first distal end (10) and the first inboard end (11) is the same as the width of the second panel member (9) between the second distal end (10) and the second inboard end (11);
b. the first tab extension (13) and the second tab extension (13) are together substantially as wide as the first panel member (9) between the first distal end (10) and the first inboard end (11); and
c. the first tab extension (13) and the second tab extension (13) are together substantially as wide as the second panel member (9) between the second distal end (10) and the second inboard end (11).

5. The structural connection (1) of claim 2 wherein:
a. at least one of the first tab extension (13) and the second tab extension (13) extends past the fold region (8).

6. The structural connection (1) of claim 2 wherein:
a. the first panel member (9) and the second panel member (9) are separated by a narrow s-curved gap (15) when the fold region (8) is not folded.

7. The structural connection (1) of claim 1 wherein:
a. the first panel member (9) is substantially planar; and
b. the second panel member (9) is substantially planar.

8. The structural connection (1) of claim 7 wherein:
a. the first panel member (9) is orthogonal to the portion of the substantially planar member (6) between the first end (7) and the fold region (8); and
b. the second panel member (9) is orthogonal to the portion of the substantially planar member (6) between the second end (7) and the fold region (8).

9. The structural connection (1) of claim 8 wherein:
a. the fold region (8) can be folded to any angle between 180 degrees and 90 degrees.

10. The structural connection (1) of claim 1 wherein:
a. one of the first elongated structural member (50) and the second elongated structural member (50) is a vertical post.

11. The structural connection (1) of claim 1 wherein:
a. the first and second substantially planar members (6) of the connector (5) are embossed.

12. The structural connection (1) of claim 11 wherein:
a. the first substantially planar member (6) of the connector (5) has a first discrete embossment (14) between the first end (7) and the fold region (8); and
b. the second substantially planar member (6) of the connector (5) has a second discrete embossment (14) between the second end (7) and the fold region (8).

13. The structural connection (1) of claim 12 wherein:
a. one of the first elongated structural member (50) and the second elongated structural member (50) is a vertical post; and
b. the other of the first elongated structural member (50) and the second elongated structural member (50) is a diagonal bracing member.

14. The structural connection (1) of claim 12 wherein:
a. one of the first elongated structural member (50) and the second elongated structural member (50) is a vertical post; and
b. the other of the first elongated structural member (50) and the second elongated structural member (50) is a horizontal beam.

15. The structural connection (1) of claim 1 wherein:
a. at least one of the first panel member (9) and the second panel member (9) is additionally attached to one of the first elongated structural member (50) and the second elongated structural member (50) with a fastener (4) that is not in its corresponding tab extension (13).

16. The structural connection (1) of claim 15 wherein:
a. at least one of the first panel member (9) and the second panel member (9) is attached to one of the first elongated structural member (50) and the second elongated structural member (50) with the fastener (4) that is in its corresponding tab extension (13), and the same panel member (9) is attached to the other of the first elongated structural member (50) and the second elongated structural member (50) with the fastener (4) that is not in its corresponding tab extension (13).

17. The structural connection (1) of claim 1 wherein:
a. the first tab extension (13) extends past the fold region (8);
b. the first panel member (9) and the second panel member (9) are separated by a narrow gap (15) when the fold region (8) is not folded; and
b. the first angular juncture (12) does not extend to the fold region (8) such that the narrow gap (15) also separates the first panel member (9) from the first substantially planar member (6) along a portion of the first substantially planar member (6) between the fold region (8) and the first end (7) of the first substantially planar member (6) adjacent the fold region (8).

18. The structural connection (1) of claim 1 wherein:
a. one of the first elongated structural member (50) and the second elongated structural member (50) has an end surface (400) that abuts one of the attachment surfaces (201, 202, 301, 302) of the other of the first elongated structural member (50) and the second elongated structural member (50).

* * * * *